(12) United States Patent
Kitching (10) Patent No.: US 11,422,111 B2
(45) Date of Patent: Aug. 23, 2022

(54) INTEGRITY MONITOR

(71) Applicant: BAE SYSTEMS plc, London (GB)

(72) Inventor: Stuart John Kitching, Rochester (GB)

(73) Assignee: BAE SYSTEMS plc, London (GB)

( * ) Notice: Subject to any disclaimer, the term of this patent is extended or adjusted under 35 U.S.C. 154(b) by 165 days.

(21) Appl. No.: 16/770,329

(22) PCT Filed: Dec. 6, 2018

(86) PCT No.: PCT/GB2018/053535
§ 371 (c)(1),
(2) Date: Jun. 5, 2020

(87) PCT Pub. No.: WO2019/110998
PCT Pub. Date: Jun. 13, 2019

(65) Prior Publication Data
US 2020/0355648 A1 Nov. 12, 2020

(30) Foreign Application Priority Data

Dec. 7, 2017 (GB) ...................................... 1720375
Jan. 16, 2018 (EP) ...................................... 18151821

(51) Int. Cl.
*G01N 27/82* (2006.01)
*G01N 25/18* (2006.01)
*G06F 3/06* (2006.01)

(52) U.S. Cl.
CPC ............. *G01N 27/82* (2013.01); *G01N 25/18* (2013.01); *G06F 3/0604* (2013.01); *G06F 3/0659* (2013.01); *G06F 3/0679* (2013.01)

(58) Field of Classification Search
None
See application file for complete search history.

(56) References Cited

U.S. PATENT DOCUMENTS 5,137,677 A 8/1992 Murata
5,959,557 A * 9/1999 Lim ..................... H03K 17/972
341/32
(Continued)

FOREIGN PATENT DOCUMENTS

CN 106018544 * 6/2016 ............. G01B 11/08
EP 0007587 A1 2/1980
(Continued)

OTHER PUBLICATIONS

International Preliminary Report on Patentability dated Jun. 9, 2020 for International Patent Application PCT/GB2018/053535, 8 pages.
(Continued)

*Primary Examiner* — Raul J Rios Russo
*Assistant Examiner* — Carl F. R. Tchatchouang
(74) *Attorney, Agent, or Firm* — Finch & Maloney PLLC (57) ABSTRACT

There is provided an integrity monitor configured to monitor the integrity of a component protection device. The component protection device comprises a protective medium to protect at least one electronic component, and having associated therewith a magnetic element and a Hall Effect sensor. The at least one of the magnetic element and the Hall Effect sensor is embedded within the protective medium and the Hall Effect sensor is located, when in use, to sense a magnetic field generated by the magnetic element. The integrity monitor has an input for receiving an output of the Hall Effect sensor indicative of the sensed magnetic field and the integrity monitor is configured to identify from the received output any change to the sensed magnetic field and determine, based on the change to the sensed magnetic field, an integrity of the component protection device.

20 Claims, 4 Drawing Sheets

(56) References Cited

U.S. PATENT DOCUMENTS

| | | | |
|---|---|---|---|
| 6,370,411 B1 * | 4/2002 | Osadchy | A61B 5/06 600/372 |
| 2002/0032531 A1 * | 3/2002 | Mansky | B01J 19/0046 702/21 |
| 2009/0145730 A1 | 6/2009 | Aizawa et al. | |
| 2010/0141249 A1 | 6/2010 | Ararao et al. | |
| 2011/0050213 A1 | 3/2011 | Furukawa | |

FOREIGN PATENT DOCUMENTS

| | | | | |
|---|---|---|---|---|
| EP | 1176480 | A1 | | 1/2002 |
| EP | 1588371 | A2 | | 10/2005 |
| EP | 2522994 | A1 * | 11/2012 | G01N 27/82 |
| EP | 2966413 | A1 | | 1/2016 |
| GB | 1349546 | A | | 4/1974 |
| GB | 2350196 | A | | 11/2000 |
| GB | 2490183 | A | | 10/2012 |
| JP | H0897486 | A | | 4/1996 |
| WO | 0150530 | A1 | | 7/2001 |
| WO | 2004055918 | A2 | | 7/2004 |
| WO | 2004064071 | A2 | | 7/2004 |
| WO | 2009050672 | A2 | | 4/2009 |
| WO | 2017137678 | A1 | | 8/2017 |
| WO | 2019110998 | A1 | | 6/2019 |

OTHER PUBLICATIONS

International Search Report and Written Opinion received for PCT Application No. PCT/GB2018/053535, dated Mar. 6, 2019. 16 pages.

GB Search Report under Section 17(5) received for GB Application No. 1720375.3, dated Apr. 13, 2018. 5 pages.

GB Search Report under Section 17 received for GB Application No. 1819919.0, dated Jun. 3, 2019. 4 pages.

Extended European Search Report received for EP Application No. 18151821.8, dated Jul. 6, 2018. 10 pages.

* cited by examiner

INTEGRITY MONITOR

FIELD OF THE INVENTION

This invention relates to a component protection device, to an integrity monitor for monitoring the integrity of a component protection device, to a method for detecting damage or disturbance to a protective medium, to a method for manufacturing a protective medium and to an electronic circuit.

BACKGROUND

There are a number of known techniques for protecting sensitive electronic components intended for use in harsh operating environments, for example where exposure to liquids, vibration or humidity are likely. In one technique, sensitive components may be encapsulated in a potting compound to provide protection. Examples of potting compounds used for this purpose include silicon and epoxy.

Potting compounds may also provide a thermally conductive path from an encapsulated component for heat dissipation.

Whether intended for protection against environmental conditions or for heat management it would be beneficial to know if or when there has been a failure of an encapsulating compound. The failure may be for example a naturally occurring fracture or damage caused by impact. Damage to the potting compound may not only expose the encapsulated components to environmental damage but it may also limit the heat-conducting ability of the compound and lead to overheating of an encapsulated component.

BRIEF DESCRIPTION OF THE DRAWINGS

Embodiments of the invention will now be described in more detail by way of example only and with reference to the accompanying drawings, of which.

DETAILED DESCRIPTION

According to some examples disclosed herein, there is provided a component protection device, comprising a protective medium having associated therewith a magnetic element and a Hall Effect sensor, wherein at least one of the magnetic element and the Hall Effect sensor is embedded within the protective medium and the Hall Effect sensor is located, when in use, to sense a magnetic field generated by the magnetic element.

Any damage or disturbance to the protective medium that results in a displacement of the magnetic element relative to the Hall Effect sensor is likely to result in a change to the sensed magnetic field of the magnetic element. The component protection device may therefore be used to provide signals indicative of such damage or disturbance.

In an example, both the magnetic element and the Hall Effect sensor are embedded within the protective medium. Any damage to the protective medium should therefore be detectable without reference to a Hall Effect sensor mounted outside of the protective medium and without relying upon a magnetic field generated outside of the protective medium.

In an example, the protective medium encapsulates one or more components to be protected. Therefore, an attempt to free the encapsulated component from the protective medium or any damage to the protective medium in the vicinity of one of the components is likely to result in a detectable relative movement of the Hall Effect sensor and the magnetic element.

In an example, the protective medium comprises a protective cover having a recess arranged, when the protective cover is in use, to protect one or more components located within the recess. In such an application, the protective cover may be secured in place over the one or more components such that any disturbance of the protective cover is likely to result in detectable damage or a detectable deformation of the cover.

In an example, the protective medium has embedded therein a layer of a magnetic material overlaying a mu-metal layer having one or more apertures positioned to correspond, when the protective medium is in use, with the position of one or more associated Hall Effect sensors. In this way a single magnetic element may be used and the magnetic field generated thereby may be selectively exposed to one or more Hall Effect sensors by the mu-metal mask.

In an example, the protective medium is manufactured using a layered structure comprising at least: a first layer of a potting compound; and a second layer of the potting compound encapsulating the at least one of a magnetic element and a Hall Effect sensor.

In an example the first layer or the second layer of the protective medium encapsulates one or more components to be protected.

In an example, the first layer or the second layer of the protective medium encapsulates at least one Hall Effect sensor. In some applications, one or more Hall Effect sensors may be positioned between components to be protected within the same layer of the protective medium.

In an example, the damage or disturbance to the protective medium comprises in particular a fracture, crack or break in the protective medium, displacement or removal of the protective medium or attempted removal involving displacement or deformation of the protective medium. In principle, any damage or disturbance that causes a relative movement between a Hall Effect sensor and an associated magnetic element is likely to detectable, above a predetermined threshold.

According to some examples disclosed herein, there is provided an integrity monitor, configured to monitor the integrity of a component protection device, the component protection device comprising a protective medium having associated therewith a magnetic element and a Hall Effect sensor, wherein at least one of the magnetic element and the Hall Effect sensor is embedded within the protective medium and the Hall Effect sensor is located, when in use, to sense a magnetic field generated by the magnetic element, the integrity monitor having an input for receiving an output of the Hall Effect sensor indicative of the sensed magnetic field and the integrity monitor is configured to identify from the received output any change to the sensed magnetic field due to damage or disturbance to the protective medium.

In an example, the integrity monitor is arranged to receive, at the input, an output from each of a plurality of Hall Effect sensors associated with the protective medium and to detect a change in any one or more of said outputs indicative of damage or disturbance to the protective medium.

In an example, the integrity monitor is arranged to supply an electric current to one or more Hall Effect sensors associated with the protective medium and to receive a corresponding output therefrom. In this way, the integrity monitor may selectively energise the available Hall Effect sensors if more than one is provided and so separate the analysis of the respective outputs.

In an example, the integrity monitor is arranged, upon detecting a change in the output of one or more Hall Effect sensors associated with the protective medium, to trigger one or more predetermined actions. Such actions may include erasing sensitive data stored by a protected component, or generating an alarm.

According to some examples disclosed herein, there is provided a method for detecting damage or disturbance to a protective medium having associated therewith a magnetic element and a Hall Effect sensor, wherein at least one of the magnetic element and the Hall Effect sensor are embedded within the protective medium and the Hall Effect sensor is located to sense a magnetic field when generated by the magnetic element, the method comprising:
  (i) at a configuration stage, receiving an output from the Hall Effect sensor indicative the sensed magnetic field and storing data indicative of said output; and
  (ii) receiving a subsequent output from the Hall Effect sensor and comparing the subsequent output with the stored data thereby to identify a change in the output due to damage or disturbance to the protective medium.

In an example, the method comprises:
  (iii) upon identifying a change at (ii), triggering one or more predetermined actions.

In an example, the method comprises supplying an electric current to the Hall Effect sensor and receiving a corresponding output therefrom.

According to a some examples disclosed herein, there is provided a method for manufacturing a protective medium, comprising:
  (a) forming a first layer of a potting compound; and
  (b) forming a second layer of the potting compound encapsulating at least one of a magnetic element and a Hall Effect sensor.

In an example of the manufacturing method, (a) comprises encapsulating one or more components to be protected in the first layer or the second layer.

In an example of the manufacturing method, (a) comprises encapsulating one or more Hall Effect sensors in the first layer and (b) comprises encapsulating one or more magnetic elements in the second layer such that each of the one or more Hall Effect sensors in the first layer is located within a magnetic field generated by at least one of the one of more magnetic elements in the second layer.

In an example, the manufacturing method comprises forming a recess in the protective medium for enclosing one or more components to be protected. In this way a protective cover may be made to enclose on or more components in the recess.

According to some examples disclosed herein, there is provided an electronic circuit having one or more components protected by a component protection device as described above according to the first aspect disclosed herein, linked to an integrity monitor as described above according to the second aspect disclosed herein.

Embodiments to be described below with reference to FIGS. 1, 2, 3 and 4 enable monitoring of the integrity of an protective medium, for example in the form of an encapsulating block or a protective cover, such that a break or other damage to the protective medium may be detected and appropriate action taken.

In one example implementation, a break or other type of damage to the protective medium may be detected where, for example, there has been a displacement of one region of the protective medium relative to another, or in the extreme, the removal of one region of, or the whole of the protective medium.

There is also a security benefit in encapsulating or at least covering components of an electronic circuit with a solid potting compound without necessarily encapsulating any such components within the compound. The potting compound is generally difficult to remove and so deters potential access to data or confidential details of circuit design, component selection, etc.

Embodiments of the present invention to be described below may detect a breach of the security provided by a protective and trigger a corresponding action, for example to delete data stored by protected components or to generate an alarm, or set non-volatile memories to write-protect to ensure that stored data is not corrupted. The unit may work incorrectly through over heating or moisture ingress caused by degradation to the potting compound. Setting the non-volatile memory could avoid any corruption of already stored data. As an example the electronics of a video camera could prevent any further video capture to memory following a warning of the potting compound failing. It would set the memories to read only.

Figure 1:
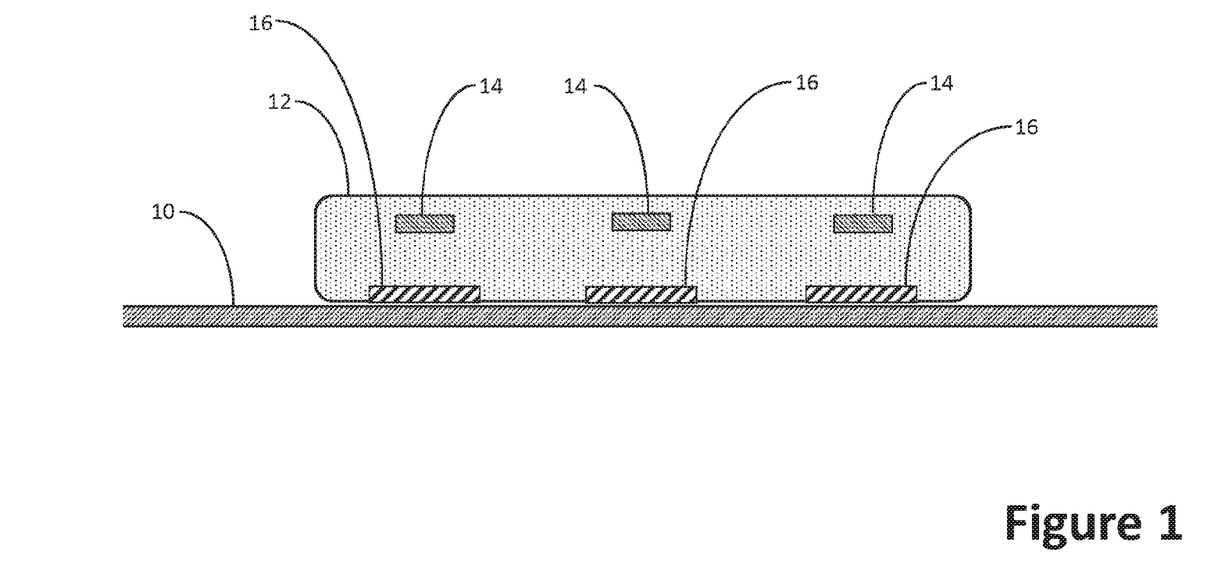
FIG. 1 shows schematically a sectional view through an example electronic circuit board having a protective medium in the form of an encapsulating block, according to an embodiment of the present invention.

Referring initially to FIG. 1, a section of a circuit board 10 is shown schematically in a sectional view having one or more electronic components (not shown in FIG. 1) encapsulated in a protective medium comprising a block 12 of a potting compound such a silicon or an epoxy. The encapsulating block 12 has embedded within it a number of magnetic elements 14, distributed in a generally regular arrangement through the block 12. A generally regular arrangement of Hall Effect sensors 16 is also provided, either mounted upon the circuit board 10, as shown in FIG. 1 with associated electrical connections to the sensors, or (not shown in FIG. 1) distributed within the encapsulating block 12 with respective electrical connections leading out of the block 12. If the Hall Effect sensors 16 are mounted upon the circuit board 10, they are embedded within the encapsulating block 12 to the extent that they protrude above the circuit board 10.

In an alternative arrangement, the Hall Effect sensors 16 may be mounted outside the encapsulating block 12 such that only the magnetic elements 14 are embedded within the block 12. In another example arrangement, only the Hall Effect sensors 16 may be embedded within the block 12 and the magnetic elements 14 may be arranged outside the block 12.

Each of the Hall Effect sensors 16, for example ratiometric Hall Effect sensors, is connected to a controller (not shown in FIG. 1), which may be a component mounted upon the circuit board 10 or a separate component, to receive voltage signals output by each Hall Effect sensor 16. The output voltage arises when a direct current is supplied to pass through a Hall Effect sensor 16 and the magnetic field generated by the magnetic elements 14 causes a potential difference within the sensor according to the strength of the generated magnetic field in the vicinity of the sensor 16 and the magnitude of the supplied current. A change in the magnetic field in the vicinity of the sensor 16 causes a corresponding and detectable change in output voltage for a given supply current. In particular, a change in the relative position of a magnetic element 14 and a sensor 16 due to a fracture or break is therefore detectable according to the change in output voltage. This may allow the integrity of the component to be monitored, and allows for an action to be taken if the integrity of the device is compromised such that it is susceptible to damage or degradation in performance. Moreover, by monitoring changes in output voltage across a group of sensors 16, for example a group of three orthogonally-oriented sensors 16, enables more information to be deduced about the location and direction of any relative movement within the encapsulating block 12.

In order to detect a change in output voltage of one of more sensors 16, the controller is configured to record an initial set of output voltage measurements and to compare measurements taken from time to time with the initially recorded measurements, thereby to detect any variation. A variation may be expected to occur when there is a relative movement of a magnetic element and a Hall Effect sensor potentially caused by a fracture or larger damage in the encapsulating block 12. This variation may be used in conjunction with a known property of the device, such as a thermal conductivity to determine if the device is susceptible to damage or degradation in performance.

The Hall Effect sensors 16 may be single dimensional sensors able to detect a magnetic field component in one direction only, usable singly or in groups of similarly oriented or differently oriented sensors 16. Alternatively, the Hall Effect sensors 16 may comprise one or more multi-dimensional sensors able to output voltage measurements representative of magnetic field components in two or three orthogonal directions. Multi-dimensional sensors are able to provide measurements indicative, for example, of x, y and z coordinates of a magnetic element 14 relative to the sensor 16. The controller is arranged to look for variations in the output voltages and thereby deduce the extent and direction of any relative movement between the magnetic element 14 and the sensor 16 due to a break of other damage to the encapsulating block 12.

In practice, any variation in output voltage that is greater in magnitude than a threshold level may be interpreted as damage to the encapsulating block 12 requiring action. The threshold level is set to take account of natural decay of the magnetic field of the magnetic elements 14, variations in a magnetic field generated by conductors of the electronic circuit when operational or variations in current supplied to the Hall Effect sensors 16.

The Hall Effect sensors 16 may output analogue voltages or they may be provided with an interface, for example a serial interface, to output digital data indicative of a sensed voltage.

Figure 2:
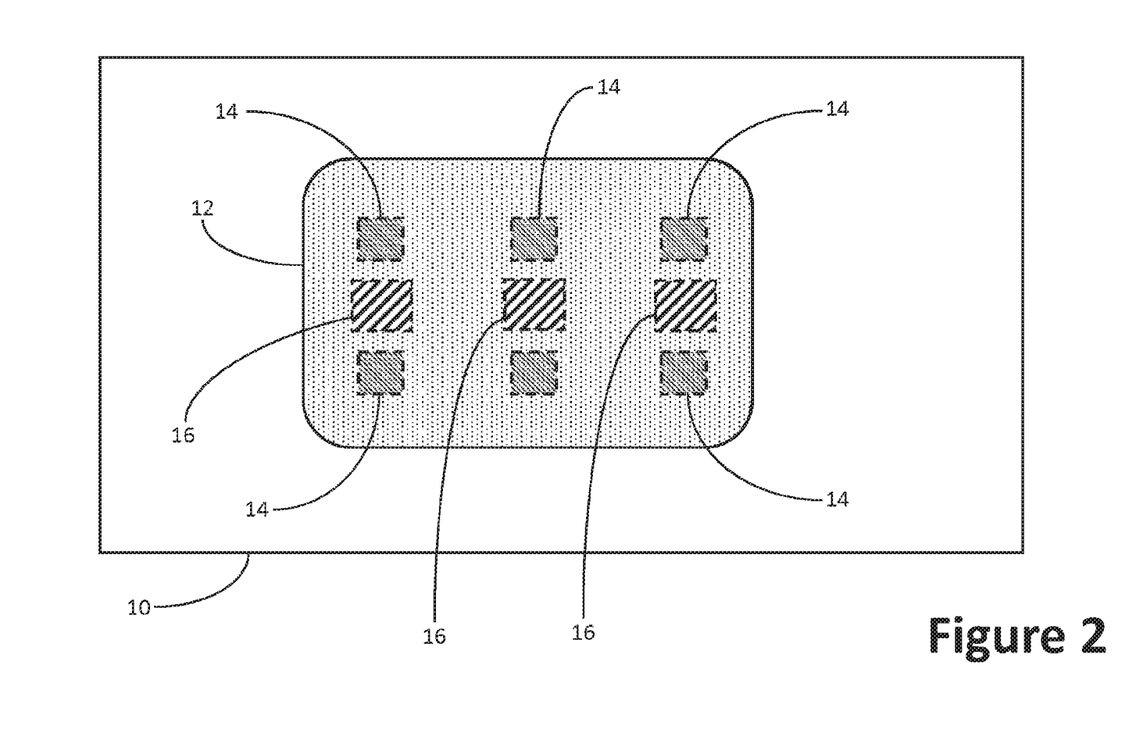
FIG. 2 shows schematically a plan view of the example encapsulating block of FIG. 1, according to an embodiment of the present invention.

Referring to FIG. 2, one example arrangement of Hall Effect sensors 16 and magnetic elements 14 is shown in a plan view of an encapsulating block 12 according to an example embodiment. In the arrangement shown in FIG. 2, each Hall Effect sensor 16 is positioned to sense a magnetic field generated by two magnetic elements 14. However, in other example arrangements each Hall Effect sensor 16 may be associated with one magnetic element 14 so that only the magnetic field of one magnetic element 14 is detectable by the sensor 16. Alternatively, two or more Hall Effect sensors 16 may be positioned to sense a magnetic field of one magnetic element 14. In another example arrangement, one Hall Effect sensor 16 may be positioned to sense a magnetic field from more than two magnetic elements 14. Any combination of these arrangements may be implemented in a protective medium of the present invention, for example in the encapsulating block 12. In each case, the separation of the magnetic elements 14 from the Hall Effect sensors 16 is predetermined according to the strength of the magnetic field generated by each element 14.

The magnetic elements 14 may comprise permanent magnets or electromagnets or a combination of permanent magnets and electromagnets. Permanent magnets have an advantage over electromagnets in not requiring a power source to generate a detectable magnetic field. However, electromagnets have an advantage in some applications of greater control over the direction and strength of the generated magnetic field and hence of the region of the encapsulating block 12 to be monitored at any particular time. An array of electromagnets may be embedded within the encapsulating material with electrically connecting wires brought out of the encapsulating block 12 to a power source under the control of the controller. The controller may be configured to select any one or more electromagnets in the array to be energised and to receive voltages or digital data from corresponding Hall Effect sensors 16.

If permanent magnets are used, the magnetic elements 14 may comprise discrete portions of magnetic material or a layer of magnetic material. A layer of magnetic material may optionally be placed over a layer of a mu-metal alloy having apertures positioned to enable a magnetic field to penetrate to a respective Hall Effect sensor 16.

Figure 3:
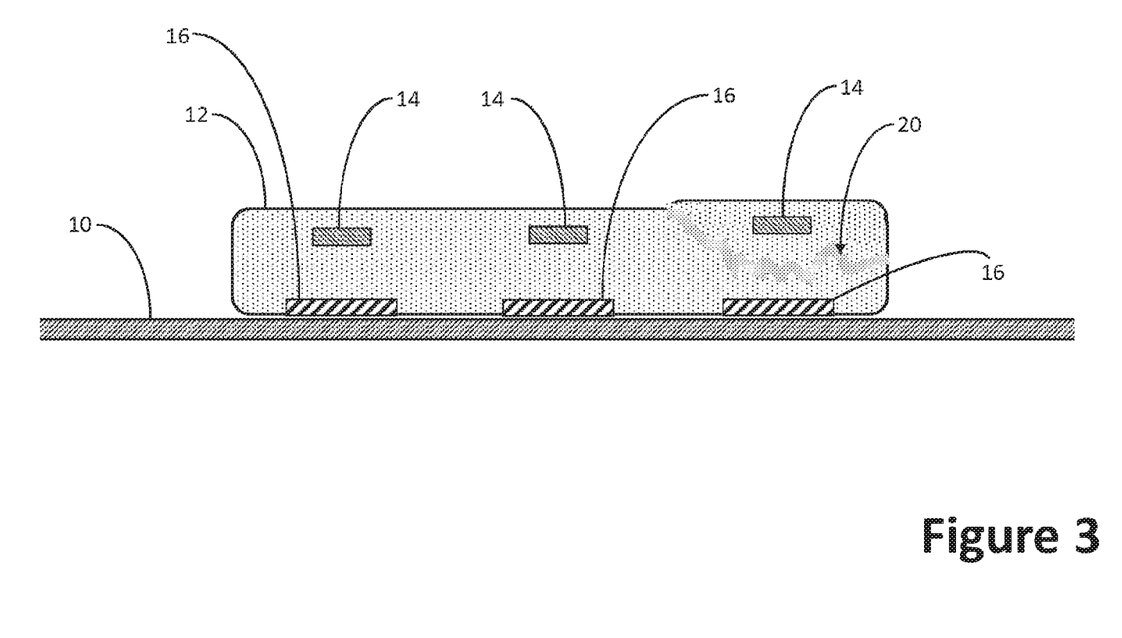
FIG. 3 shows schematically the sectional view as in FIG. 1, with an example of a type of damage that may be detected according to embodiments of the present invention.

Referring to FIG. 3, the sectional view of FIG. 1 is reproduced showing an example of a type of damage 20 that may be detected by a controller receiving voltages or digital data output from the one or more sensors 16. The controller may be configured to process voltage measurements or digital data output by individual Hall Effect sensors 16 or by selected groups of Hall Effect sensors 16 to detect a damage 20. In the latter case, the measurements from each selected group of sensors 16 may be combined to provide a measurement representative of the position of the group relative to respective magnetic elements 14. The controller may also include appropriate voltage and current control components to ensure that a consistent level of voltage or current is applied to each Hall Effect sensor 16 at the time of making measurements of the magnetic field.

The controller may comprise a field-programmable gate array (FPGA) or other programmable logic device or data processor configured to store initial voltage or digital data values from the sensors 16 during a configuration or initialisation stage. The FPGA may then receive output from the sensors 16 at predetermined time intervals and compare the received output with the stored values to detect any change indicative of damage to the encapsulating block 12. If damage is detected, the FPGA may for example generate an alert, erase data from encapsulated components or trigger another predetermined action appropriate to the detection of damage.

A protective medium such as the encapsulating block 12 according to embodiments disclosed herein may be manufactured using a layered structure. A first layer of a potting compound may for example be deposited, optionally to encase components of the circuit, optionally including a predetermined arrangement of one or more Hall effect sensors 16, leaving a surface a predetermined distance from the Hall effect sensors 16. The one or more magnetic elements 14 may be arranged over the surface at predetermined positions relative to the Hall Effect sensors 16, optionally having first applied a mu-metal layer with appropriately positioned apertures. The one or more magnetic elements 14 may then be encased in a further layer of the potting compound to complete the encapsulating block 12.

Examples have been described above in the context of an encapsulating block 12 for an electronic circuit. However, a protective medium according to embodiments of the present invention may include material encapsulating other types of component requiring protection or providing a protective layer not necessarily encapsulating anything other than an arrangement of one or more Hall Effect sensors 16 and/or one or more magnetic elements 14 according to the principles described above. In such applications, the principles described above may be applied to detect types of damage to an encapsulating or protective layer of solid material that results in relative movement of encapsulated magnetic elements and associated Hall Effect sensors. One example arrangement of a protective medium in the form of a protective cover will now be described with reference to FIG. 4.

Figure 4:
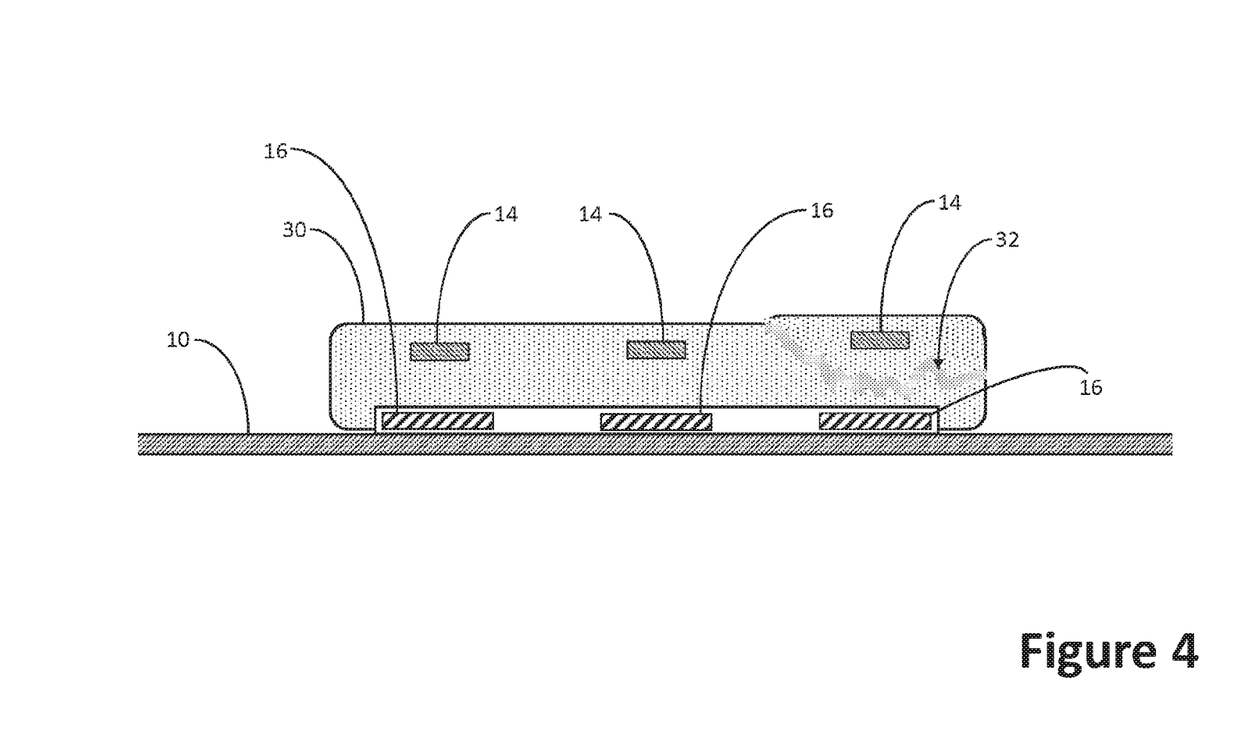
FIG. 4 shows schematically a sectional view through an example electronic circuit board having a protective medium in the form of a protective cover according an example embodiment of the present invention.

Referring to FIG. 4, a schematic sectional view is provided of a circuit board 10 as in FIG. 1, but with a protective cover 30 providing protection or security to one or more components (not shown in FIG. 4) mounted upon the circuit board 10. An arrangement of Hall effect sensors 16 is shown mounted upon the circuit board 10 in a cavity beneath the protective cover 30, but within a magnetic field of a respective magnetic element 14 embedded within the protective cover 30. Any damage to the protective cover such as a break 32 or an attempt to remove the protective cover 30 from the circuit board 10 causes a change in the relative positions of a Hall Effect sensor 16 and a magnetic element 14. Such a change may be detected by a controller receiving output from the Hall Effect sensors 16, as described above.

Other arrangements, as would be apparent to a person of ordinary skill in the relevant art, of a solid material having at least one of a Hall Effect sensor and a magnetic element embedded therein for the purpose of detecting damage or other form of compromise to the arrangement of solid material, are intended to fall within the scope of the present invention as now claimed.

In some examples a component protection device comprises a protective medium having associated therewith a magnetic element and a Hall Effect sensor, wherein at least one of the magnetic element and the Hall Effect sensor is embedded within the protective medium and the Hall Effect sensor is located, when in use, to sense a magnetic field generated by the magnetic element.

In some examples both the magnetic element and the Hall Effect sensor are embedded within the protective medium.

In some examples the protective medium encapsulates one or more components to be protected.

In some examples the protective medium comprises a protective cover having a recess arranged, when the protective cover is in use, to protect one or more components located within the recess.

In some examples the protective medium has embedded therein a layer of a magnetic material overlaying a mu-metal layer having one or more apertures positioned to correspond, when the protective medium is in use, with the position of one or more associated Hall effect sensors.

In some examples the protective medium is manufactured using a layered structure comprising at least: a first layer of a potting compound; and a second layer of the potting compound encapsulating the at least one of a magnetic element and a Hall Effect sensor.

In some examples the first layer or the second layer of the protective medium encapsulates one or more components to be protected.

In some examples the first layer or the second of the protective medium encapsulates at least one Hall Effect sensor.

In some examples the damage or disturbance to the protective medium comprises in particular a fracture, crack or break in the protective medium, displacement or removal of the protective medium or attempted removal involving displacement or deformation of the protective medium.

The invention claimed is:

1. An integrity monitor, configured to monitor the integrity of a component protection device, the component protection device comprising a protective medium to protect at least one electronic component, the component protection device having associated therewith a magnetic element and a Hall Effect sensor, wherein the magnetic element and the Hall Effect sensor are each embedded within the protective medium and the Hall Effect sensor is configured to sense a magnetic field generated by the magnetic element, the integrity monitor having an input for receiving an output of the Hall Effect sensor indicative of the sensed magnetic field, and the integrity monitor is configured to:
   identify from the received output any change to the sensed magnetic field; and
   determine, based on the change to the sensed magnetic field, an integrity of the component protection device.

2. The integrity monitor according to claim 1, wherein the integrity monitor is configured to monitor a thermal conductivity of the protective medium.

3. The integrity monitor according to claim 1, wherein the integrity monitor is configured to monitor a susceptibly of the protective medium to environmental conditions.

4. The integrity monitor according to claim 3, wherein the environmental conditions include at least one of: water, sand, and temperature.

5. The integrity monitor according to claim 1, arranged to receive, at the input, an output from each of a plurality of Hall effect sensors associated with the protective medium and to detect a change in any one or more of said outputs indicative of damage or disturbance to the protective medium.

6. The integrity monitor according to claim 1, arranged to supply an electric current to one or more Hall Effect sensors associated with the protective medium and to receive a corresponding output therefrom.

7. The integrity monitor according to claim 1, wherein the integrity monitor is arranged, upon detecting a change in the integrity of the component protection device, to trigger one or more predetermined actions.

8. The integrity monitor according to claim 7, wherein the one or more predetermined actions include setting non-volatile memory associated with the electronic component to a write-protect state.

9. A method for detecting a change to an integrity of a protective medium to protect at least one electronic component, the protective medium having associated therewith a magnetic element and a Hall Effect sensor, wherein the magnetic element and the Hall Effect sensor are each embedded within the protective medium and the Hall Effect sensor is configured to sense a magnetic field generated by the magnetic element, the method comprising:
   at a configuration stage, receiving an output from the Hall Effect sensor indicative the sensed magnetic field and storing data indicative of said output; and receiving a subsequent output from the Hall Effect sensor and comparing the subsequent output with the stored data thereby to identify a change in the output due to the change in integrity of the protective medium.

10. The method according to claim 9, comprising:

upon identifying the change, triggering one or more predetermined actions.

11. The method according to claim 10, wherein the one or more actions comprises setting non-volatile memory associated with the electronic component to a write-protect state.

12. The method according to claim 9, comprising supplying an electric current to the Hall Effect sensor and receiving a corresponding output therefrom.

13. An electronic circuit having one or more components monitored by an integrity monitor according to claim 1.

14. A controller for detecting a change to an integrity of a protective medium, the protective medium having associated therewith a magnetic element and a Hall Effect sensor, wherein the magnetic element and the Hall Effect sensor are each embedded within the protective medium, and the Hall Effect sensor is configured to sense a magnetic field generated by the magnetic element, the controller configured to:

receive a first output from the Hall Effect sensor indicative the sensed magnetic field and store data indicative of the first output;

receive a second output from the Hall Effect sensor; and compare data indicative of the second output with the stored data indicative of the first output, to identify a change in the output due to a change in integrity of the protective medium.

15. The controller according to claim 14, wherein the controller is configured to:

upon identifying a change in the output due to a change in integrity of the protective medium, trigger one or more predetermined actions.

16. The controller according to claim 15, wherein the one or more actions comprises setting non-volatile memory associated with the electronic component to a write-protect state.

17. The controller according to claim 14, wherein the controller is configured to: supply an electric current to the Hall Effect sensor; and receive a corresponding output therefrom.

18. An integrity monitoring system, comprising:

the controller according to claim 14; and the magnetic element and the Hall Effect sensor.

19. The system according to claim 18, wherein upon detecting damage or disturbance to the protective medium, the controller is configured to trigger one or more predetermined actions.

20. The system according to claim 19, wherein the one or more actions comprises setting non-volatile memory associated with the electronic component to a write-protect state.

* * * * *